United States Patent [19]

Church

[11] Patent Number: 4,843,210
[45] Date of Patent: Jun. 27, 1989

[54] DOWNWARD GAS-METAL-ARC WELDING PROCESS

[76] Inventor: John G. Church, 7405 Kimbel, Mississauga, Ontario, Canada, L4T 3M6

[21] Appl. No.: 204,826

[22] Filed: Jun. 10, 1988

[51] Int. Cl.⁴ ............................................. B23K 9/16
[52] U.S. Cl. .................................... 219/126; 219/74; 219/137 R
[58] Field of Search .................... 219/74, 126, 137 R

[56] References Cited

U.S. PATENT DOCUMENTS 4,436,981  3/1984  Sakamoto et al. ................ 219/126
4,463,243  7/1984  Church ............................... 219/74

Primary Examiner—Clifford C. Shaw
Attorney, Agent, or Firm—Harness, Dickey & Pierce

[57] ABSTRACT

A gas-metal-arc welding process, utilizing a consumable, axially advanced, wire electrode and a four-gas shielding mixture, forms a weld bead along a vertically downwardly direction. As the bead is formed, the electrode is moved vertically downwardly in alignment with the central axis of the bead, with the tip of the electrode gapped from the weld material deposit which forms the bead. A relatively high electrical voltage and current density is applied to the electrode to produce a stable, conically-shaped hot plasma field. The field is concentric with the axis of the electrode and extends across the gap. The plasma field is positioned to transversely overlay, and to be substantially coextensive with, the full width of the bead. Molten metal globules transfer by free flight along the axis of the field, from the electrode tip across the gap to the weld deposit to laterally spread out and adhere to the deposit to form the bead.

12 Claims, 1 Drawing Sheet

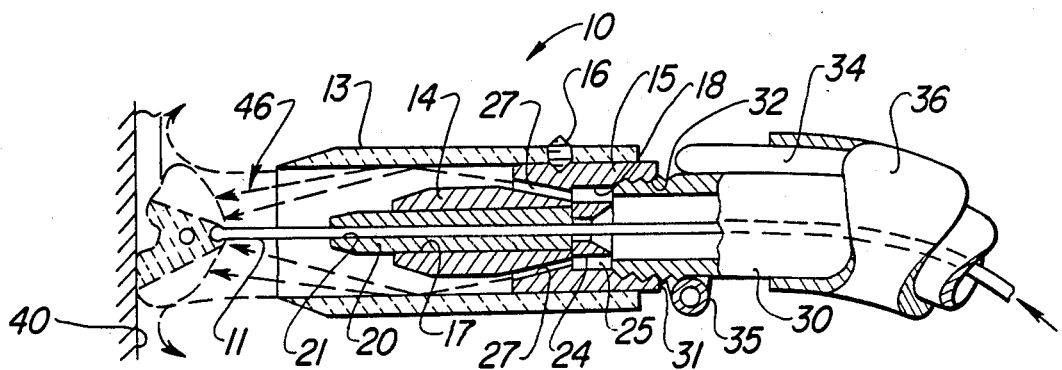
Fig-1
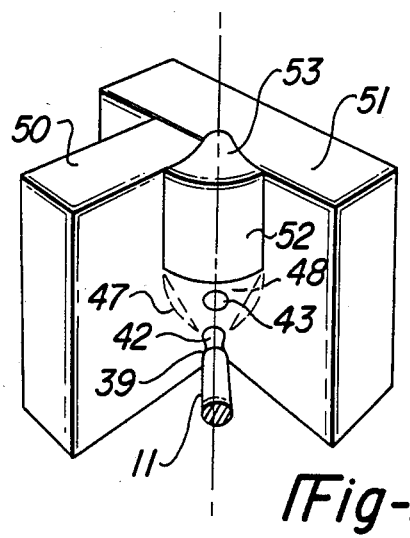
Fig-2
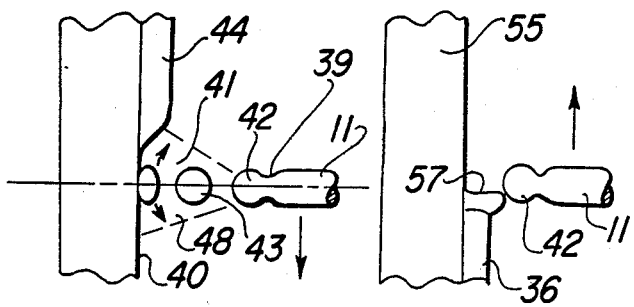
Fig-3
Fig-4
PRIOR ART
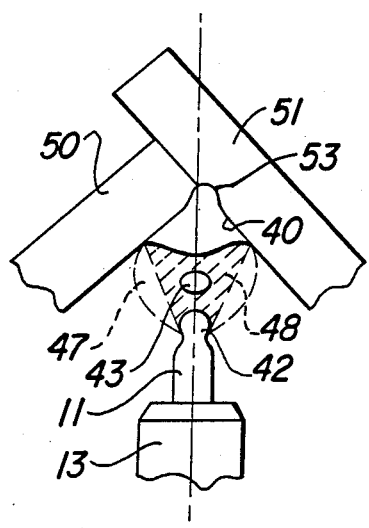
Fig-5
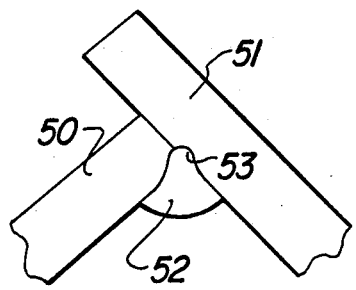
Fig-6
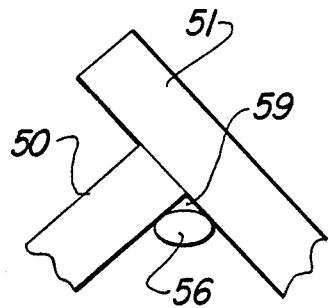
Fig-7
PRIOR ART

DOWNWARD GAS-METAL-ARC WELDING PROCESS

BACKGROUND OF INVENTION

This invention relates to gas-metal-arc welding process by which a vertically downward weld deposit bead can be produced. The process involves continuously feeding a consumable or meltable electrode wire towards the weld deposit, utilizing a shielding gas flowing around the end of the electrode and the arc gap, to produce a plasma field in the gap. This process, by controlling and appropriately positioning the plasma field and causing a globular free-flight transfer for depositing metal from the wire upon the weld pool or deposit, permits welding downwardly, i.e. moving the welding wire downwardly, without run-off of the molten metal due to gravity.

In prior, generally vertically arranged weld beads, the procedure for applying the weld involved depositing the metal in an upward direction. That is, weld material has been applied upon the substrate and molten material applied upon the "shelf" or upper end of the weld bead so that the bead is gradually built upwardly. The prior system is relatively slow and presents quality and penetration problems. Thus, this invention is an improvement to the prior upward welding system for forming generally upright or vertical welds.

The general process involved, that is, the utilization of a shielding gas comprising a four-gas mixture, with a consumable wire electrode and the production of a hot plasma field within which the weld metal transfer occurs, is disclosed in my prior U.S. Pat. No. 4,463,243, issued July 31, 1984, for a "Welding System." Said process is additionally and further described in my subsequent U.S. Pat. No. 4,572,942, issued Feb. 25, 1986, for a "Gas-Metal-Arc Welding Process." In addition, the process may utilize a welding gun, such as disclosed in my prior U.S. Pat. No. 4,464,560, granted Aug. 7, 1984, for an "Arc Welding Gun With Gas Diffuser and External Cooling Conduit" to John G. Church and Emerson G. Malone. Further, a suitable welding gun and this kind of process is further disclosed in U.S. Pat. No. 4,529,863, issued July 16, 1985, for a "Gas-Metal-Arc Welding Method" to John-Claude Lebel.

The process disclosed in these prior patents produced a high rate of deposition of weld material which rapidly forms high-quality weld beads. The rate of metal deposition, the speed of formation of the bead and the quality of the bead all are substantially improved as compared with earlier welding processes. However, my U.S. patent application, Ser. No. 190,309, filed May 4, 1988, for a "High Rate Deposition Gas-Metal-Arc Welding Process" discloses a generally similar process but achieving substantially higher rates of speed for forming weld beads.

In this present application, I have discovered a process for producing, at relatively high deposition rates, weld beads in a downward direction, that is, by moving the welding wire, with the welding gun, downwardly, as compared to the prior processes utilized for forming verticaltype welds, namely, upwardly. This present, downward procedure produces high-quality welds with better penetration and much greater speeds of formation than that previously achievable through the conventional upwardly formed beads.

SUMMARY OF INVENTION

This invention contemplates a process for forming weld beads downwardly, that is, depositing the bead metal along a downward path for producing "vertical" or upright weld beads. The process includes the utilization of a consumable wire electrode which is arranged roughly horizontal relative to the weld substrate and which is surrounded by a flowing four-gas mixture directed around the electrode and towards the substrate. Sufficient electrical voltage and amperage is applied to the electrode to produce a hot plasma field in the arc gap between the end of the electrode and the substrate. This plasma field is generally conical in shape and is arranged coaxially, at all times, to the axis of the electrode wire.

Metal is transferred from the electrode to the substrate by means of globular, free-flight transfer wherein the globules of metal move along the axis of the conical plasma field, coaxially with the electrode wire. Meanwhile, the base of the conical field is positioned, by suitably adjusting the voltage and the length of the arc gap, to be coextensive, transversely, with the width of the forming bead. Thus, the globules are precisely directed along the axis of the plasma and upon reaching the substrate are uniformly spread out or distributed thereon and adhere to the substrate.

The welding gun within which the wire electrode is melted, is advanced in an axial direction at a rate sufficient to provide the metal needed to compensate for the melt-off of the globules. In addition, the welding gun is moved downwardly along a path which is in alignment with the central axis of the bead and equidistant from the opposite edges of the bead. Thus, the length of the arc gap is maintained, the continuous flow of the globules is maintained at a consistent rate, and the base of the conical plasma field remains coextensive with the width of the bead. This results in a high-speed deposition of metal, wherein the metal adheres and there is no run-off due to gravity. The resulting bead is of a generally higher quality than that achievable in the prior upward welding. In addition, a better penetration pattern and depth is achieved through this improved method.

One object of this invention is to provide a method which substantially increases the speed of formation, the quality of, and the penetration characteristics of a generally vertically arranged bead, that is, a welding bead which is generally upright. This object is achieved utilizing presently available equipment and presently available skilled welders so that the cost of the improved weld and speed of welding is not increased, but rather is decreased per unit because of the faster arc time for producing such welds.

A further object of this invention is to produce inexpensively a higher quality weld by a downward welding system.

Still a further object of this invention is to form a weld bead in one pass, with the bead being accurate and uniform in its shape and cross-section, with the weld being formed against the normal gravitational forces at a higher rate than that previously accomplished with upward type of welding.

These and other objects and advantages of this invention will become apparent upon reading the following description, of which the attached drawings form a part.

DESCRIPTION OF DRAWINGS

FIG. 1 is an elevational, cross-sectional view, schematically showing the welding gun and the welding operation.

FIG. 2 is a perspective, schematic view showing the application of the weld bead in downward direction.

FIG. 3 is an enlarged, schematic, side view showing the application of the globules, by free flight, in downward movement of the welding rod.

FIG. 4 schematically shows the prior art method by which the bead is formed in a vertically upward direction, utilizing short-circuit transfer of molten metal from the tip of the welding wire electrode.

FIG. 5 is a schematic, plan view showing the application of a fillet weld to a pair of intersecting plates, utilizing the downward weld method.

FIG. 6 is a schematic, plan view showing the penetration achieved with the fillet type of weld.

FIG. 7 schematically illustrates a prior art weld, produced by welding upwardly, and showing a gap or fault which frequently occurs in such type of welding.

DETAILED DESCRIPTION

FIG. 1 illustrates, in cross-section, a consumable wire gas-metal-arc welding gun 10 of the type disclosed in my above-mentioned U.S. Pat. No. 4,464,560. This gun is utilized to weld with a wire electrode 11. The gun has a ceramic nozzle or sleeve 13 which surrounds a cylindrical diffuser 14 through which the wire is passed.

The diffuser includes an enlarged head 15 which closely fits within the nozzle. The nozzle is immovably attached to the head by means of a suitable set screw 16. The diffuser has a central bore 17 through which the wire electrode slides. In addition, its head 15 has an enlarged counterbore 18.

A tubular tip member 20 fits into the central bore 17 of the diffuser. This tip member has a central opening 21, which is slightly larger than the diameter of the wire electrode, so that the opening forms a guide through which the wire is fed.

A ring-like spacer 24 is inserted within the enlarged counterbore 18 of the diffuser head 15. This spacer ring has a number of radially outwardly extending fins 25. Thus, there are spaces around the outside of the ring and between the fins. These spaces communicate with angled passages 27 drilled in the head 15 of the diffuser.

A copper tube 30, having a threaded end 31, is attached to the diffuser head by means of threads 32 which form a threaded socket within the counterbore 18. A coolant tube 34 surrounds the copper tube and terminates in a loop 35 near the connection between the copper tube and the diffuser. Cooling water may be circulated through the coolant tube using a conventional pump and valve system, which are commercially available.

A sleeve 36 surrounds the copper tube and the coolant tube to provide a hand grip for the welder. This sleeve and additional external sleeves or grips are conventional.

The welding gun is arranged horizontally or aimed at a slight downward angle so that the tip 39 of the electrode is aimed toward the surface 40, i.e. weld deposit, pool or substrate, upon which the weld will be formed. Thus, an arc gap 41 is maintained between the tip 39 and the weld surface 40.

During operation of the welding apparatus, a globule 42 forms on the tip of the electrode. The connection between the forming globule and the end of the electrode gradually necks down until the globule is released. Then the released globules 43 transfer, by free flight, to the weld bead or deposit 44 into which it is absorbed.

In this system, a gas flow 46, comprising a four-gas mixture, flows through the copper tube 30 into the spaces between the fins 25 of the ring-like spacer 24. The flowing gas continues through the angled passages 27 in the diffuser head 15. Then, as illustrated by the dotted lines, the gas stream or flow angles against the interior surface of the nozzle 13 and then is reflected towards the central axis of the wire. Part of the gas flow is focused towards the intersection of the wire electrode axis and the weld surface 40, and part of the flow proceeds in a laminar-type flow towards the weld surface from which it is deflected.

The gas flow, with the application of an appropriate electrical voltage and current to the wire electrode, generates a plasma field 47 within the arc gap. The plasma field includes a central, hot plasma zone 48 which is approximately conical in shape.

By appropriately adjusting the voltage and the length of the arc gap, the circular base of the hot plasma zone cone 48 may be positioned upon the weld surface so as to span the full width of the weld surface. That is, by centralizing the cone upon the central axis of the weld bead or the band of substrate upon which the bead is to be formed, the base of the cone can be transversely extended from side to side of the width of the band. Then, movement of the wire electrode towards the weld surface can be adjusted to maintain the length of the arc gap as the globules are melted off the weld tip. Simultaneously, the electrode is moved downwardly, in alignment with the central axis of the bead or the narrow band of the surface upon which the bead will be formed, equidistantly from the side edges of that band. Thus, the cone is stably controlled with respect to the axis of the wire, and the globules move along the axis of the wire.

The globules, upon reaching the weld pool, immediately spread out in all directions and adhere to the weld pool into which each globule is absorbed. This results in good adherence of the globules to the downwardly forming weld bead, notwithstanding the force of gravity which otherwise would tend to cause the molten globule to run down.

The operation of the downwardly moving weld electrode is schematically illustrated in FIG. 2. Thus, FIG. 2 illustrates a pair of intersecting plates 50 and 51 and the formation of a fillet weld 52 at the corner or intersection of the two plates. As can been schematically, the fillet weld deeply penetrates the plates at 53 to form a very rough T-shape cross-section which produces a better quality, stronger, crack-resistant weld.

FIG. 3 schematically illustrates the movement of the electrode downwardly, in the direction of the axis of the bead. The globule 42 on the tip of the electrode is released, and the travelling globules 43 freeflow, along the axis of the electrode and the plasma cone, to the weld surface.

FIG. 4 schematically illustrates the prior art weld method by which the weld is formed by moving the wire electrode upwardly. In this system, the plate 55 is used as a substrate upon which an upwardly formed weld bead 56 is applied. The electrode wire 11 forms a globule 42 upon its tip. However, this globule is transferred by a short circuit welding transfer, that is, by touching the globule to the weld pool at the shelf-like formation 57 on the upper end of the upwardly formed bead 56.

As illustrated in FIG. 6, the bead formed by the process of this application produces a sound, deep penetration. In contrast, the prior method for producing upwardly-formed beads has a tendency to be imperfect in places, including forming gaps 59, illustrated in exaggerated form in FIG. 7.

The wire electrode may vary in composition and diameter. As examples, electrodes, which are commercially available, may run in a diameter range of between about 0.016 to 0.062 inches. Preferable diameters are roughly in the range of between about 0.035 to 0.45 inches. The composition of the wire may be varied depending upon the nature of the welding and the results desired. Such compositions are known and commercially available.

Conventional feed mechanisms and systems for applying the desired electrical current and voltage are commercially available and known. Thus, the details of these are not included in this description.

It is desired, in performing the method of this application, to utilize a voltage which is roughly in the range of between about 20–40volts. A good, satisfactory voltage range is at about the middle point, that is, around 29–30 volts. The amperage may be set sufficiently high to produce a current density of about 400,000 amps per square inch of electrode wire cross-section. Preferably, the current density range is at a higher rate, such as around 500,000 amps per square inch and higher, depending upon circumstances, up to roughly 700,000 amps per square inch.

The length of the exposed portion of the electrode wire and the length of the arc may be varied, based upon trial and error for a particular welding purpose. By way of example, the "stick-out," that is, the length of the wire between the end of the tubular tip 20 and the free end of the ceramic nozzle 13 may be in the range of about 5/16 inch. Then, the wire may continue outwardly of the end of the nozzle for about ½, with an approximate ½ inch arc gap. These dimensions, however, are illustrative and, as mentioned, will vary depending on circumstances.

The rate of deposit, utilizing the globular transfer system and the downwardly moving electrode wire, can be three to five times, more or less, than the rate of deposition of the vertical up welding method. By way of example, a deposition of 10–12 lbs. per hour may be achieved with the downward weld method of this application as contrasted with a deposition rate of approximately 3 lbs. per hour utilizing a corresponding vertically upward method of welding of the prior art. Notwithstanding the higher deposition rate, the molten globules readily adhere to the forming weld bead rather than run downwardly under the influence of gravity, as would be expected.

This invention may be further developed within the scope of the following claims.

Accordingly, having fully described an operative embodiment of this invention, I now claim:

1. A gas-metal-arc welding process utilizing a consumable wire electrode for forming a narrow, elongated weld bead in a downward direction comprising essentially the steps of:

positioning a generally horizontally arranged, consumable, then wire electrode with its free end gapped from a weld deposit surface to provide an air gap therebetween;

applying an electrical voltage to the electrode and applying an electrical current to the electrode sufficient to produce a relatively high current density in the electrode;

continuously flowing a stream of gas, formed of a mixture of major proportions of argon and helium and minor proportions of carbon dioxide and oxygen, along and coaxial with the end of the electrode and the arc gap towards the weld deposit surface to form a roughly conically-shaped hot plasma field within and coaxial with the air gap;

adjusting the length of the arc gap and the voltage applied to the electrode to locate the base of the conically-shaped field upon the surface and substantially coextensively overlapping transversely the width of the weld bead;

generating a globular, free-flight transfer of molten metal globules from the electrode across the gap to the weld deposit surface;

advancing the electrode longitudinally towards the surface at a speed correlated to the rate of melting and transfer of globules from the end thereof to maintain a constant length of arc gap;

moving the electrode downwardly in alignment with the central axis of the downwardly directed weld bead deposited by the globule transfer, at a speed correlated to the rate of melting of the globules from the electrode end for producing a substantially uniform weld bead along a downward direction.

2. A process as defined in claim 1, and including said gases being in the range of: argon—between about 40-70%; helium—between about 25-60%; carbon dioxide—between about 3-10%; and oxygen—between about 0.1-2%, by volume.

3. A process as defined in claim 2, and including the current density being at least about 400,000 amps/in.$^2$ of cross-section of the wire electrode.

4. A process as defined in claim 1, and including applying a voltage in the range of roughly between about 20-40 volts.

5. A gas-metal-arc welding process for depositing an elongated weld bead along a roughly vertically downward direction upon a weld deposit substrate, comprising essentially the steps of:

(a) continuously advancing a meltable, thin wire electrode in a generally horizontal direction towards a narrow, roughly vertically elongated, band-like weld deposit substrate, while maintaining a substantially uniform length arc gap between the tip of the electrode and said substrate;

(b) applying a relatively high electrical voltage to the electrode and an electrical current sufficient to produce a high-current density within the electrode;

(c) continuously flowing a gas mixture, formed of major proportions of argon and helium, and minor proportion of carbon dioxide and oxygen, along and coaxial with the tip of the electrode and the arc gap in a direction towards the weld deposit substrate;

(d) forming a generally conically-shaped, hot plasma field within, and coaxial with, the arc gap;

(e) locating the base of the field substantially transversely coextensive with the width of the band-like weld deposit substrate, by adjusting the voltage and the arc gap length;

(f) maintaining a globular, free-flight transfer of molten metal from the electrode tip to the weld deposit substrate along the axis of the electrode and plasma field;

(g) advancing the electrode towards the substrate at a speed correlated to the rate of melting metal from the tip of the electrode to maintain a constant length arc gap and a consistent rate of globular transfer;

(h) moving the electrode downwardly in alignment with the bead axis, centrally between the side edges of the bead, at a rate correlated to the rate of bead formation by the transferred globules.

6. A process as defined in claim 5, and including said gases being in the range of: argon—between about 40-70%, helium—between about 25-60%; carbon dioxide—between about 3-10%; and oxygen—between about 0.5-2%, by volume.

7. A process as defined in claim 6, and including maintaining the voltage in a range of approximately between about 20-40 volts.

8. A process as defined in claim 7, and including maintaining the voltage at between about 29-30 volts.

9. A process as defined in claim 7, and including maintaining the current density at a minimum of 400,000 amps/in.$^2$ of cross-section of electrode wire.

10. A gas-metal-arc welding process for depositing a weld bead in a downward direction upon a metal deposit surface, comprising the steps of:

(a) continuously advancing a consumable, thin wire electrode towards the metal deposit surface while maintaining a substantially uniform length arc gap between the free end of the electrode and the surface;

(b) applying a relatively high electrical voltage to the electrode, such as on the order of between about 20-40 volts;

(c) applying a relatively high electrical amperage to the electrode sufficient to produce a high-current density in excess of about 450,000 amps per square inch of electrode cross-sectional area;

(d) continuously flowing a gas mixture, formed of major proportions of argon and helium, and minor proportions of carbon dioxide and oxygen, along, and coaxial with, the end portion of of the electrode and the arc gap towards the metal deposit surface;

(e) forming a roughly conically-shaped, hot plasma field within, and coaxial with, the arc gap, and maintaining the base of the conically-shaped field upon the metal deposit surface with the plasma field coaxially centered upon the weld metal bead formed by the weld deposit and the base of the conically-shaped field maintained transversely coextensive with the width of the bead;

(f) maintaining a substantially globular, free-flight transfer of molten metal drops from the electrode end to the metal deposit surface;

(g) advancing the electrode along the axial length of the bead in alignment with the axis of the bead, and centered between the opposite edges of the bead, at a speed correlated to the rate of melting of globules from the end thereof to maintain the length of the arc gap substantially constant;

(h) and moving the electrode downwardly at a rate correlated to the rate of melting of the electrode so that its end remains substantially parallel and uniformly spaced from the metal deposit surface.

11. A process as defined in claim 10, and including said gas mixture comprising essentially between about 40-70% argon, between about 25-60% helium, between about 3-10% carbon dioxide, and between about 0.1-2% oxygen.

12. A process as defined in claim 11, and including correlating the voltage and the length of the air gap to position the base of the plasma field so that its diameter is essentially the same as the width of the weld bead and so that the base substantially overlaps the transverse width of the bandlike weld deposition bead.

* * * * *

UNITED STATES PATENT AND TRADEMARK OFFICE
CERTIFICATE OF CORRECTION

PATENT NO. : 4,843,210

DATED : June 27, 1989

INVENTOR(S) : John G. Church

It is certified that error appears in the above-identified patent and that said Letters Patent is hereby corrected as shown below:

In claim 1, col. 5, line 68, change "then" to --thin--

In claim 5, col. 6, line 61, change "proportion" to --proportions--

Signed and Sealed this

Nineteenth Day of February, 1991

*Attest:*

HARRY F. MANBECK, JR.

*Attesting Officer*  *Commissioner of Patents and Trademarks*